US008708007B2

(12) United States Patent
Jackson

(10) Patent No.: US 8,708,007 B2
(45) Date of Patent: Apr. 29, 2014

(54) WOODTURNING TOOL

(76) Inventor: Craig Jackson, Lexington, KY (US)

( * ) Notice: Subject to any disclaimer, the term of this patent is extended or adjusted under 35 U.S.C. 154(b) by 440 days.

(21) Appl. No.: 13/135,008

(22) Filed: Jun. 23, 2011

(65) Prior Publication Data

US 2011/0315274 A1 Dec. 29, 2011

Related U.S. Application Data

(60) Provisional application No. 61/398,278, filed on Jun. 23, 2010.

(51) Int. Cl.
*B23B 27/04* (2006.01)
*B23B 5/40* (2006.01)

(52) U.S. Cl.
USPC .......... 142/56; 142/49

(58) Field of Classification Search
USPC ....... 142/56, 49, 36; 407/65; 30/298; 144/46, 144/229
See application file for complete search history.

(56) References Cited

U.S. PATENT DOCUMENTS

| | | | | |
|---|---|---|---|---|
| 932,576 | A * | 8/1909 | Ramsey | 407/10 |
| 938,600 | A * | 11/1909 | Lowe | 407/66 |
| 2,914,098 | A * | 11/1959 | McLennan, Sr. | 142/56 |
| 4,924,924 | A * | 5/1990 | Stewart | 142/49 |
| 5,682,933 | A * | 11/1997 | Martel | 142/56 |
| 6,464,433 | B1 * | 10/2002 | Shaffer | 407/66 |
| 6,974,282 | B2 * | 12/2005 | King et al. | 407/107 |
| 7,032,633 | B2 * | 4/2006 | Clay | 144/33 |
| 7,490,640 | B2 * | 2/2009 | Hege | 142/56 |

* cited by examiner

*Primary Examiner* — Will Fridie, Jr.
(74) *Attorney, Agent, or Firm* — Gary K. Price

(57) ABSTRACT

A hand-held cutting tool for use in cutting a turning timber workpiece, the cutting tool including a handle end, a tool shank having a width and a height wherein the width is greater than the height, and a curved neck that includes a cutting head. The curved neck is integral to the tool shank and has a width and a height wherein the height is greater than the width. The tool shank defines a tool rest portion having a planar surface. The cutting head includes a top surface that is coplanar to the tool rest portion and defines a centrally disposed threaded bore for threadably receiving a replaceable carbide cutter. The cutting head and a length of the tool shank extend parallel to each other and parallel to a longitudinal axis.

17 Claims, 3 Drawing Sheets

WOODTURNING TOOL

CROSS REFERENCES TO RELATED APPLICATIONS

U.S. Provisional Application for Patent No. 61/398,278, filed Jun. 23, 2010, with title “Easy Hollower Tool Bar” which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates generally to woodturning and, in particular, to a hand-held tool for use in the shaping of a timber workpiece into an article on a woodturning lathe.

2. Brief Description of Prior Art

Woodturning is a form of woodworking that is used to create wooden objects (e.g. a bowl or a table leg) on a lathe using cutting tools. Woodturning differs from most other forms of woodworking in that the wood is moving while a relatively stationary tool is used to cut and shape the wood. Many intricate shapes and designs can be made by turning wood or woodturning.

A large range of woodturning tools are available for shaping wooden objects as described. Such cutting tools include chisels and gouges as well as scraping tools such as scrapers, and are variously shaped to permit rapid rough cutting and scraping followed by more careful fine surface finishing in order to form a smooth hollow-ware article quickly.

Despite the advances in technology for manufacturing wood products, hand turned products are more highly valued and sought after than mass-produced products. This creates a high demand for hand turned products. Also, woodturning products by hand is a hobby enjoyed by many. Accordingly, there is a need for tools for creating hand turned products.

Traditional woodturning tools are hardened round steel shanks with a handle that rests against a tool rest on a lathe. A piece of wood is attached to the lathe and when the wood is spun around by the lathe, the user slowly applies the sharpened steel tool to the wood so that the wood is cut down with each pass. Each user must learn to angle the tool precisely so that a cutting edge is properly presented to the wood to allow the cut to be safely made. Generating cutting forces on traditional turning tools, with positive cutting angled edges, causes the tool to roll in the users hands and be drawn into the work piece. These forces traditionally have been countered by the grip force of the user or some secondary equipment. Also, as the tool is presented at a positive cutting angle to the wood, traditional tools want to be drawn into the piece of wood gouging it, dislodging it from the lathe and/or destroying the wood piece.

As will be seen from the subsequent description, the preferred embodiments of the present invention overcome disadvantages of the prior art. In this regard, the present invention discloses a woodturning tool designed:

- specifically for easy access to the most challenging hollow form shapes;
- all pressures generated by the wood cutting are transferred into the tool rest portion of the tool with no rolling dangers as found on traditional round bar tools;

- the tool performs at a neutral cutting angle resulting in no dangerous forces causing the tool to get drawn into the wood or being rotated in the users grip.

SUMMARY OF THE INVENTION

The preferred embodiment of the present invention, a woodturning tool, includes a handle end, a cutting head and a tool shank. The cutting head is disposed on a curved neck that is preferably formed integral with tool shank such that the cutting head and the length of the tool shank extend parallel to each other and parallel to a longitudinal axis.

Tool shank defines a tool rest portion that rests flat against a tool rest of a woodturning lathe. In use the tool rest portion of the woodturning tool is positioned flat on the lathe’s tool rest and parallel to the floor. The tool rest portion having a generally square cross-sectional shape that defines a width “W” and height “H” where the width W is greater than the height H. The curved neck also defines a width “W” and height “H” where the height H is greater than the width W.

Cutting head includes a flat surface that defines a threaded bore to threadably receive a replaceable carbide cutter. In use, a flat top carbide cutter is threadably received and “seated” in the threaded bore with the purpose to cut wood on the lathe.

DESCRIPTION OF THE PREFERRED EMBODIMENT

The device of the present invention is directed to a hand-held tool for use in the shaping of a wood workpiece. In particular, the present tool is a cutter that in application, rests flat on the tool rest of the lathe and parallel to the floor. Unlike the prior art, and as will be described, the woodturning tool of the present invention includes defined support areas that counteract rotational forces incurred during cutting. As a result, the pressures generated by the wood cutting process are transferred to these support areas in the tool with no rolling dangers as found on traditional tools. Also, the present tool is presented at a neutral cutting angle to the workpiece in order to avoid dangerous forces that traditionally draw the tool into the workpiece during use. In the broadest context, the woodturning tool as disclosed consists of components configured and correlated with respect to each other so as to attain the desired objective.

Figure 1:
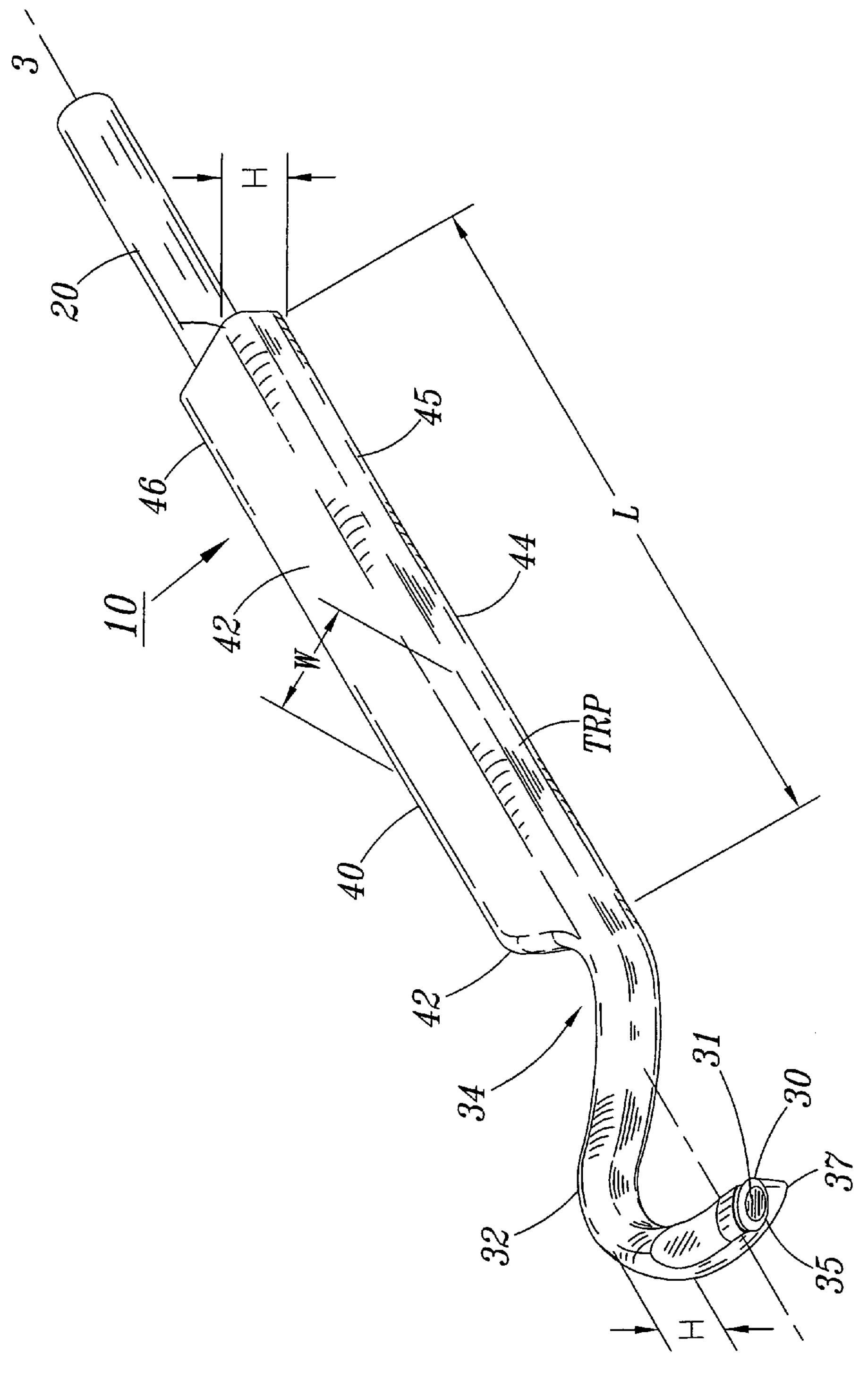
FIGS. 1-2 are perspective views of the present invention, a woodturning tool.
Figure 2:
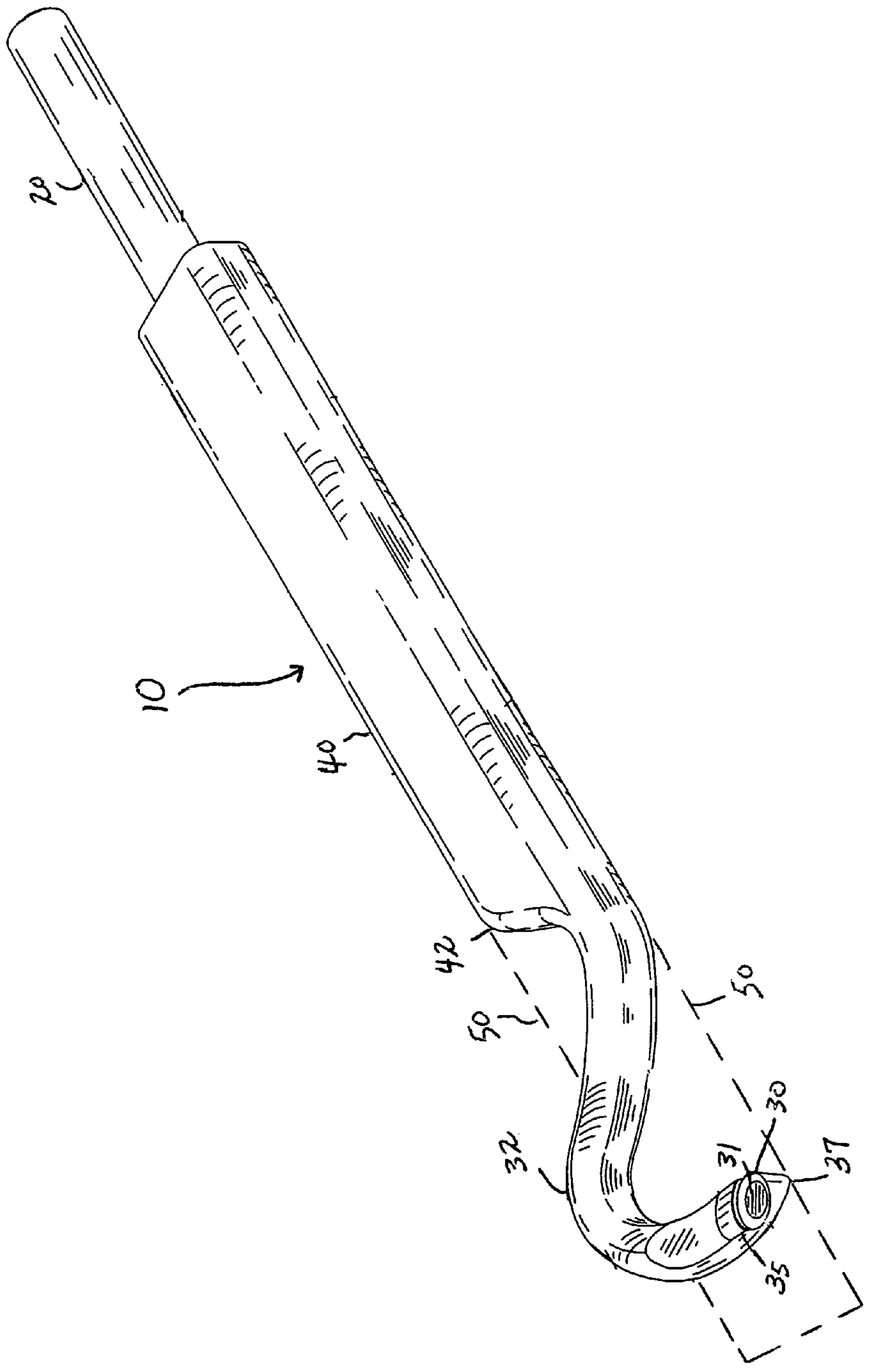
Figure 3:
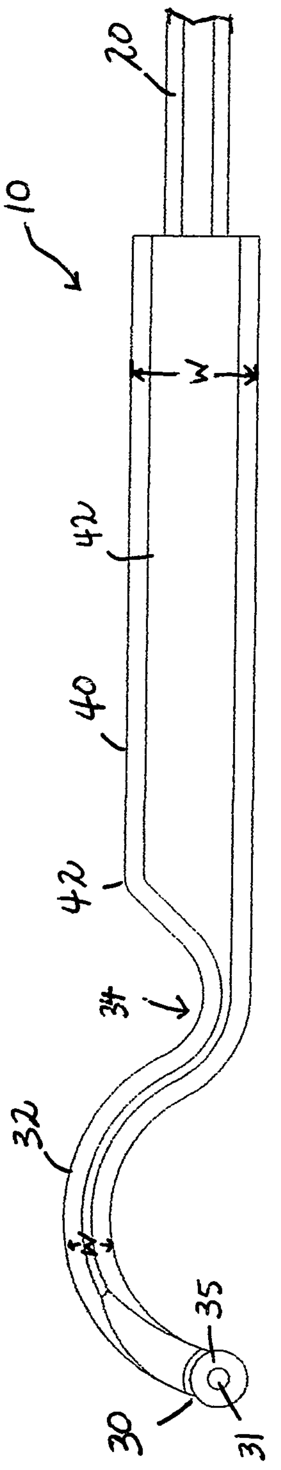
FIG. 3 is a side view of the woodturning tool illustrated in FIG. 1

FIGS. 1-3 illustrate a preferred embodiment of a woodturning tool made in accordance with the present invention. The woodturning tool indicated as numeral 10 generally includes a handle end 20, a cutting head 30 and a tool shank 40 therebetween. As should be understood, a separate handle (not shown) is connected to end 20 for manual gripping of the tool 10 during use.

The cutting head 30 is disposed on a neck 32 opposite handle end 20. As further illustrated, neck 32 is preferably formed integral with tool shank 40 in order to improve the overall strength of tool 10. However, neck 32 may alternatively be formed separate and be removably rigidly connected to an end 42 of shank 40.

As illustrated, neck 32 has a curved configuration and defines a concavity 34 adjacent the end 42 of the tool shank 40. The curved neck 32 as described allows the cutting head 30 better access inside many difficult hollow form shapes.

As best illustrated in FIG. 1, tool shank 40 is of a generally square cross-sectional shape. In particular, tool shank 40 includes a top portion 42 and a bottom portion 44 that further defines a tool rest portion "TRP" having a planar surface that can be rested flat against a tool rest of a woodturning lathe (not shown) which is then used as a fulcrum for tool 10, so that cutting head 30 will be more easily orientated and retained in a correct position during use. The tool shank 40 further includes a first side 45 and a second side 46 opposite the first side 45, the first side 45 having a length "L" as illustrated in FIG. 1. In use the tool rest portion TRP is positioned flat on the lathe's tool rest and parallel to the floor. As illustrated, the tool rest portion TRP having the generally cross-sectional shape defines a width "W" and height "H" where the width W is greater than the height H. Further, and as will be further described, the width W of the tool rest portion TRP is substantially wider than any other cross-sectioned portion of the tool 10.

In use, the tool rest portion TRP of the tool shank 40 defines a first support area that positions the cutting head 30 at the correct angle (a neutral cutting angle) to cut wood as it rests flat on the lathe's tool rest and parallel to the floor. In this position during use, almost all pressures generated by wood cutting operation is transferred down into the tool rest portion TRP with no rolling dangers as found on traditional round tool bars. Further, since the cutting head 30 performs at a neutral cutting angle, there are no dangerous forces causing it to get drawn in to the wood or being rotated in the user's grip.

Tool 10, has cutting head 30 extending coaxially of tool shank 40 so that cutting head 30 and the length of tool shank 40 extend parallel to each other and also parallel to longitudinal axis 3.

Cutting head 30 includes a flat surface 35 that is substantially coplanar to the tool rest portion TRP and defines a centrally disposed threaded bore 31 designed to threadably receive a replaceable carbide cutter. As illustrated, the threaded bore 31 downwardly extending in the flat surface 35 is perpendicular to the length L side 45. In use, a flat top carbide cutter (not shown) is threadably received and "seated" in the threaded bore 31 with the purpose to cut wood on the lathe.

Cutting head 30 further includes an edge 37 opposite the flat surface 35. Referring to FIG. 2, a footprint 50 corresponding to the periphery of tool shank 40 is illustrated. In the preferred embodiment, it is critical that edge 37 of cutting head 30 is disposed within that footprint 50.

The neck 32 defines a width "W" and height "H" where the height H is greater than the width W. The inventor has found that a configuration of a curved neck having the height H of greater thickness than the width W defines a second support area that places strength in the same direction as the cutting forces during use.

A handle (not shown) appropriately attached to the handle end 20 is provided for providing a surface for the user to grip woodturning tool 10 for operation. Preferably, handle may be attached to the handle end 20 to allow cutting head 30 to be aligned with the longitudinal axis of woodturning tool 10. Handle may be any handle and may be made out of any material, including but not limited to, wood.

In use, woodturning tool 10 is presented to a surface defining a hollow of a turning wood workpiece (not shown) so that an edge of the carbide cutter in the threaded bore 31 is in cutting contact with the hollow surface and, the tool rest portion TRP of the tool shank 40 rests flat on the lathe's tool rest and parallel to the floor positioning the cutting head 30 at a neutral cutting angle. In this position during use, almost all pressures generated by wood cutting operation is transferred down into the tool rest portion TRP with no rolling dangers as found on traditional round tool bars. Further, since the cutting head 30 performs at a neutral cutting angle, there are no dangerous forces causing it to get drawn in to the wood or being rotated in the user's grip. The curved neck 32 enables cutting head 30 to be inserted into the hollow and the user maintain control of the tool 10, thereby avoiding the negative cutting forces discussed. Tool 10 is then moved so that the edge of the cutter sweeps over the surface with a cutting action.

Although the above description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A hand-held cutting tool for use in cutting a turning timber workpiece, said cutting tool comprising:

a handle end, a cutting head, a tool shank disposed between said handle end and cutting head, wherein said cutting head is disposed on a distal end of a curved neck, said curved neck having a straight portion opposite said distal end that extends horizontally from an end of said tool shank, said curved neck further defines a concavity that extends from said straight portion and wherein said distal end is adjacent said concavity defining a spacing between said cutting head and said end of said tool shank, and said curved neck further having a bottom surface, wherein said tool shank is of a generally square cross-sectional shape that has a first width and a first height, wherein said first width is greater than said first height, said tool shank further defines a tool rest portion, and wherein said curved neck has a second width and a second height, and wherein said second height is greater than said second width, said cutting head includes a flat surface that is substantially coplanar to said tool rest portion and opposite a cutting head end adjacent said bottom surface of said curved neck, wherein said flat surface defines a centrally disposed bore for receiving a replaceable carbide cutter, attaching means to releasably attach said replaceable carbide cutter to said bore, wherein said cutting head and a length of said tool shank extend parallel to each other and parallel to a longitudinal axis.

2. The cutting tool as recited in claim 1, wherein said tool rest portion has a planar surface.

3. The cutting tool as recited in claim 2, wherein said curved neck is formed integral to said tool shank.

4. The cutting tool as recited in claim 3, wherein said centrally disposed bore is a threaded bore.

5. The cutting tool as recited in claim 4, wherein said replaceable carbide cutter is threadably received in said threaded bore.

6. The cutting tool as recited in claim 5, wherein said tool shank further includes a side surface that defines a length and wherein said cutting head is substantially coplanar to said length.

7. The cutting tool as recited in claim 6, further including a handle appropriately attached to said handle end.

8. The cutting tool as recited in claim 7, wherein said handle is made out of wood.

9. The cutting tool as recited in claim 8, wherein said threaded bore is perpendicular to said longitudinal axis.

10. A hand-held cutting tool for use in cutting a turning timber workpiece, said cutting tool comprising:

a handle end, a tool shank, wherein said tool shank has a first width and a first height that defines a first support area and wherein said first width is greater than said first height, a curved neck having a straight portion that extends from an end of said tool shank and a distal end opposite said straight portion, said distal end includes a cutting head spaced from said tool shank, and wherein said curved neck has a second width and a second height that defines a second support area and wherein said second height is greater than said second width, said cutting head includes a top surface having an edge, and further defines a centrally disposed bore for receiving a replaceable carbide cutter, wherein said centrally disposed bore is a threaded bore for threadably receiving the replaceable carbide cutter, wherein said tool shank includes a side surface that defines a length, wherein said edge and said length are substantially coplanar and parallel to a longitudinal axis, and said edge is disposed within a footprint defined by said tool shank.

11. The cutting tool as recited in claim 10, wherein said tool shank further defines a tool rest portion.

12. The cutting tool as recited in claim 11, wherein said tool rest portion has a planar surface.

13. The cutting tool as recited in claim 12, wherein an edge of said cutting head is substantially coplanar with said tool rest portion.

14. The cutting tool as recited in claim 13, wherein said curved neck is formed integral to said tool shank.

15. The cutting tool as recited in claim 14, further including a handle appropriately attached to said handle end.

16. The cutting tool as recited in claim 15, wherein said handle is made out of wood.

17. The cutting tool as recited in claim 13, wherein said threaded bore is perpendicular to said longitudinal axis.

* * * * *